United States Patent
Liu et al.

(10) Patent No.: US 9,331,562 B2
(45) Date of Patent: May 3, 2016

(54) POWER FACTOR CONVERTER WITH NONLINEAR CONVERSION RATIO

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yu-Chen Liu, Taipei (TW); Jin Chyuan Huang, Hsinchu (TW); Chao-Fu Wang, Tainan (TW); Yi-Fu Chen, Bade (TW); Yu-Kang Lo, Taipei (TW); Huang-Jen Chiu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 16 days.

(21) Appl. No.: 14/280,894

(22) Filed: May 19, 2014

(65) Prior Publication Data

US 2015/0236608 A1    Aug. 20, 2015

(30) Foreign Application Priority Data

Feb. 17, 2014   (CN) .......................... 2014 1 0053980

(51) Int. Cl.
| | | |
|---|---|---|
| G05F 1/00 | (2006.01) |
| G05F 1/613 | (2006.01) |
| G05F 3/16 | (2006.01) |
| H02M 1/12 | (2006.01) |
| H02M 1/14 | (2006.01) |
| H02M 7/08 | (2006.01) |
| H02M 1/00 | (2006.01) |
| H02M 1/42 | (2007.01) |

(52) U.S. Cl.
CPC .............. *H02M 1/12* (2013.01); *H02M 1/4208* (2013.01); *H02M 1/4225* (2013.01); *Y02B 70/126* (2013.01)

(58) Field of Classification Search
USPC .......... 323/207, 222–226; 363/39–48, 65, 67, 363/69, 70, 78
See application file for complete search history.

(56) References Cited

U.S. PATENT DOCUMENTS

| | | | |
|---|---|---|---|
| 2003/0169014 A1* | 9/2003 | Kadah ........................... | 318/727 |
| 2007/0029987 A1* | 2/2007 | Li ................... | 323/363 |
| 2011/0148368 A1* | 6/2011 | Burns et al. ................... | 323/225 |
| 2012/0081936 A1* | 4/2012 | Walters ........................... | 363/80 |
| 2013/0077371 A1* | 3/2013 | Liquicia et al. ............... | 363/127 |

* cited by examiner

*Primary Examiner* — Adolf Berhane
*Assistant Examiner* — Gary Nash
(74) *Attorney, Agent, or Firm* — McClure, Qualey & Rodack, LLP (57) ABSTRACT

The present invention provides a power-factor converter with nonlinear conversion ratio, wherein the power-factor converter includes a first inductor, a second inductor, a rectifier circuit and a switch circuit. The switch circuit is arranged to be switched to form a circuit equivalent to a parallel connection of the first inductor and the second inductor during an inductor-charging-phase for charging the first inductor and the second inductor in parallel by an AC power source, and form a circuit equivalent to a series connection of the first inductor L1 and the second inductor L2 during an inductor-discharging-phase for discharging the first inductor and the second inductor to the rectifier circuit in series.

10 Claims, 13 Drawing Sheets

POWER FACTOR CONVERTER WITH NONLINEAR CONVERSION RATIO

CROSS REFERENCE TO RELATED APPLICATIONS

This Application claims priority of China Patent Application No. 201410053980.1, filed on Feb. 17, 2014, the entirety of which is incorporated by reference herein.

BACKGROUND OF THE INVENTION

1. Field of the Invention

The present invention relates to a power-factor converter, and in particular it relates to a power-factor converter with nonlinear conversion ratio having low total harmonic distortion and a high power-factor.

2. Description of the Related Art

Power conversion equipment, especially AC to DC converters, is something that various electronic devices can't operate without. In electronic devices that require large amounts of power, power consumption may exceed the specification limits, interfering with the device; thus for an electronic device, power-factor correction (PFC) is an extremely important technology. The technology not only helps conserve energy and cut down on electricity fees, but it also effectively decreases electric pollution and noise.

However, the conventional power-factor converter improve the duty, the valid value of input current, and the total harmonic distortion.

BRIEF SUMMARY OF THE INVENTION

A detailed description is given in the following embodiments with reference to the accompanying drawings.

The present invention provides a power-factor converter with a nonlinear conversion ratio. The power-factor converter with nonlinear conversion ratio includes a rectifier circuit, a first inductor, a second inductor and a switch circuit. The first inductor has a first terminal coupled to a first terminal of an AC power source, and a second terminal coupled to a first input terminal of the rectifier circuit. The second inductor has a first terminal coupled to a second terminal of the AC power source and a second terminal coupled to a second input terminal of the rectifier circuit. The switch circuit includes a first bidirectional switch and a second bidirectional switch. The first bidirectional switch has a first terminal coupled to the first terminal of the first inductor and a second terminal coupled to the second terminal of the second inductor. The second bidirectional switch has a first terminal coupled to the first terminal of the second inductor and a second terminal coupled to the second terminal of the first inductor.

The present invention further provides a power-factor converter with nonlinear conversion ratio. The power-factor converter with nonlinear conversion ratio includes a first inductor, a second inductor, a rectifier circuit and a switch circuit. The switch circuit is coupled between the first inductor, the second inductor, the rectifier circuit and an AC power source. The switch circuit is arranged to conduct or cut off the electricity of the first inductor and the second inductor from the AC power source, wherein the switch circuit is arranged to couple the first inductor with the second inductor in parallel driving in an inductor-charging phase, and to couple the first inductor with the second inductor in series driving an inductor-discharging phase.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
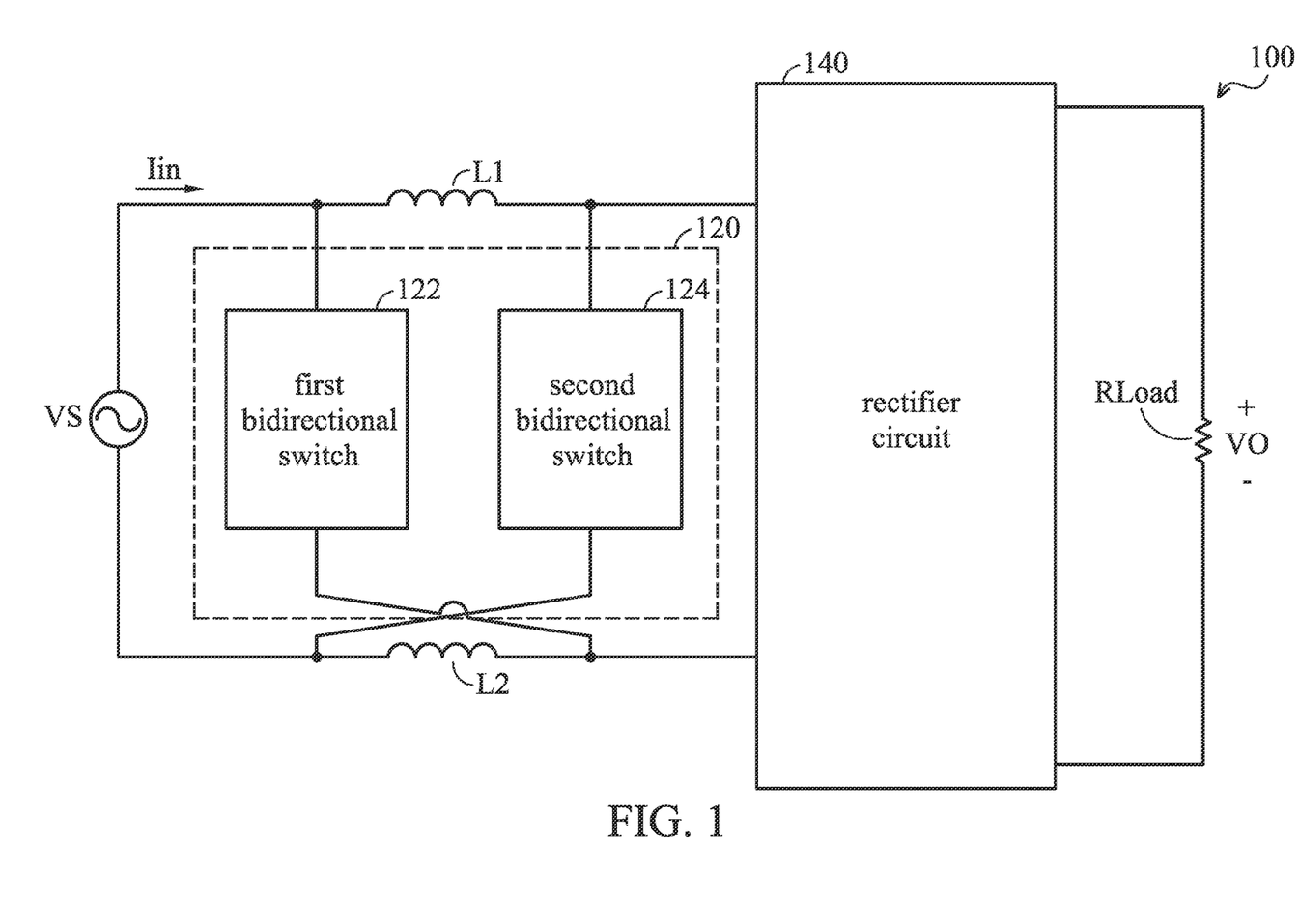
FIG. 1 is a schematic diagram illustrating an embodiment of a power-factor converter with nonlinear conversion ratio of the present invention.

FIG. 1 is a schematic diagram illustrating an embodiment of a power-factor converter with nonlinear conversion ratio of the present invention. The power-factor converter 100 with nonlinear conversion ratio includes a first inductor L1, a second inductor L2, a switch circuit 120 and a rectifier circuit 140. The first inductor L1 and the second inductor L2 are coupled between an AC power source VS and the rectifier circuit 140, respectively. The switch circuit 120 is coupled between the first inductor L1, the second inductor L2, the rectifier circuit 140 and the AC power source VS. The switch circuit 120 is arranged to be switched by a predetermined frequency, such as 60 kHz, but it is not limited thereto. The switch circuit 120 is arranged to be switched with the predetermined frequency to conduct or cut off the electricity of the first inductor L1 and the second inductor L2 from the AC power source AS, such that the power-factor converter 100 with nonlinear conversion ratio may operate between an inductor-charging phase and an inductor-discharging phase. In the inductor-charging phase, the switch circuit 120 is arranged to form a circuit equivalent to a parallel connection of the first inductor L1 and the second inductor L2. In the inductor-discharging phase, the switch circuit 120 is arranged to form a circuit equivalent to a series connection of the first inductor L1 and the second inductor L2. The first inductor L1 and the second inductor L2 are charged by the AC power source VS in parallel in the inductor-charging phase to increase the slope of the input current Iin. Furthermore, the waveform of the input current Iin is closer to the voltage at the zero-crossing point due to the increased slope of the input current Iin, such that the power-factor (PF) of the power-factor converter 100 is raised and the total harmonic distortion (THD) is reduced.

More specifically, the first inductor L1 has a first terminal coupled to a first terminal of the AC power source VS and a second terminal coupled to a first input terminal of the rectifier circuit 140. The second inductor L2 has a first terminal coupled to a second terminal of the AC power source VS and a second terminal coupled to a second input terminal of the rectifier circuit 140. The switch circuit 120 further includes a first bidirectional switch 122 and a second bidirectional switch 124.

The first bidirectional switch 122 has a first terminal coupled to the first terminal of the first inductor L1 or the first terminal of the AC power source VS. The first bidirectional switch 122 further has a second terminal coupled to the second terminal of the second inductor L2 or the second input terminal of the rectifier circuit 140. The second bidirectional switch 124 has a first terminal coupled to the first terminal of the second inductor L2 or the second terminal of the AC power source VS. Furthermore, the second bidirectional switch 124 further has a second terminal coupled to the second terminal of the first inductor L1 or the first input terminal of the rectifier circuit 140. It should be noted that, in one of the embodiments of the present invention, the first bidirectional switch 122 and the second bidirectional switch 124 is switched with a predetermined frequency, wherein the first bidirectional switch 122 and the second bidirectional switch 124 are simultaneously turned on and simultaneously turned off. More specifically, the first bidirectional switch 122 and the second bidirectional switch 124 are turned on in the inductor-charging phase to form a circuit equivalent to a parallel connection of the first inductor L1 and the second inductor L2 for charging the first inductor L1 and the second inductor L2 in parallel by the AC power source VS. The first bidirectional switch 122 and the second bidirectional switch 124 are turned off in the inductor-discharging phase to form a circuit equivalent to a series connection of the first inductor L1 and the second inductor L2 for discharging electrical energy stored in the first inductor L1 and the second inductor L2 to the rectifier circuit 140, wherein the electrical energy of the first inductor L1 and the second inductor L2 is stored during the inductor-charging phase.

Figure 2:
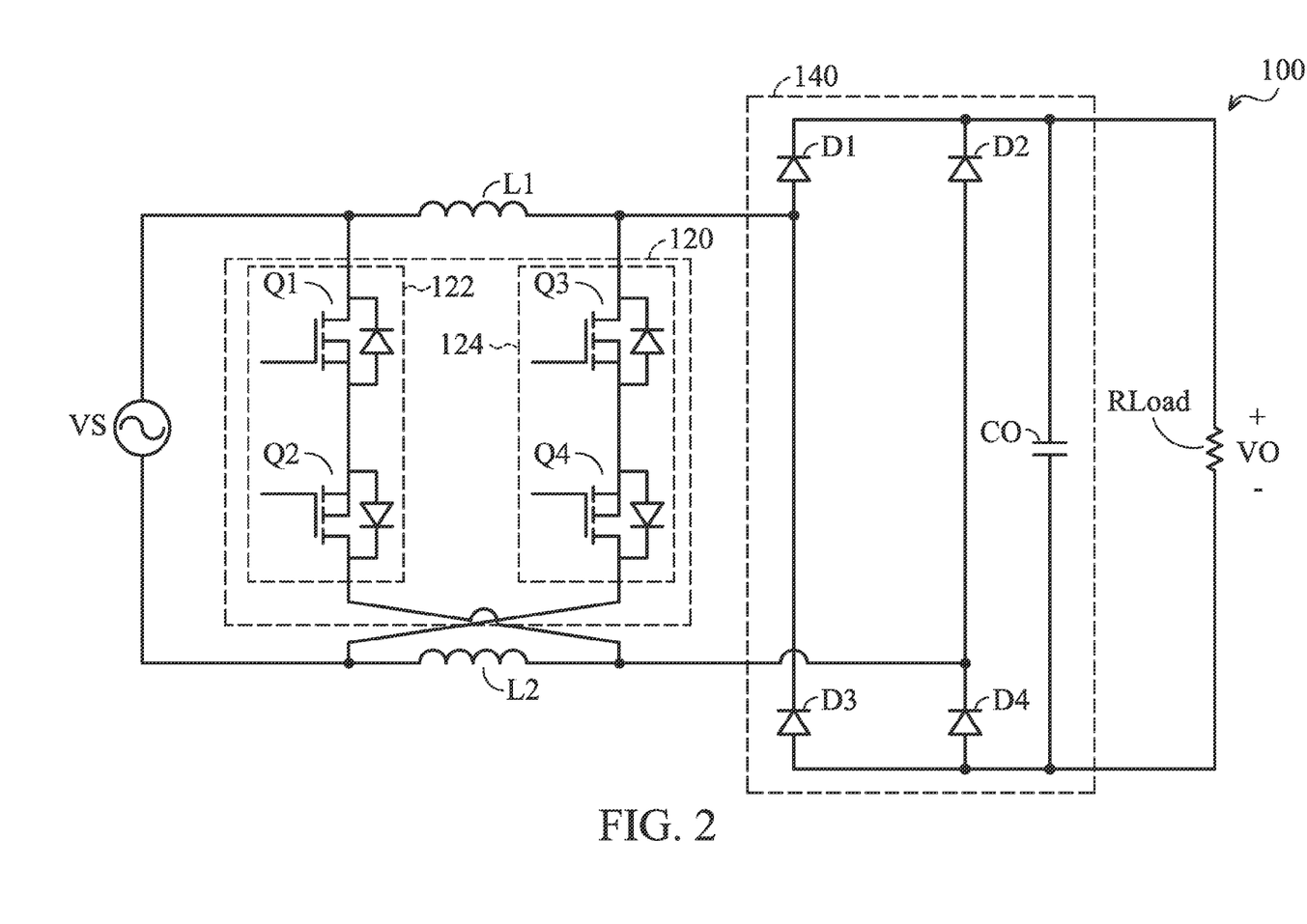
FIG. 2 is a schematic diagram illustrating an embodiment of the power-factor converter with nonlinear conversion ratio of FIG. 1 of the present invention.

FIG. 2 is a schematic diagram illustrating an embodiment of the power-factor converter with nonlinear conversion ratio of FIG. 1 of the present invention. In this embodiment, the first bidirectional switch 122 and the second bidirectional switch 124 of the power-factor converter 100 with nonlinear conversion ratio are constituted by two N-type field effect transistors with body diodes, but it is not limited thereto. The first bidirectional switch 122 and the second bidirectional switch 124 can also be other bidirectional switches constituted by other elements. For example, the first bidirectional switch 122 and the second bidirectional switch 124 can be constituted by P-type field effect transistors or other elements. Moreover, in this embodiment, the rectifier circuit 140 is a bridge-rectifier circuit, but it is not limited thereto. In other embodiments of the present invention, the rectifier circuit 140 can be a voltage-doubling circuit or another rectifier circuit.

More specifically, the first bidirectional switch 122 has a first N-type field effect transistor Q1 and a second N-type field effect transistor Q2. The first N-type field effect transistor Q1 has a source terminal coupled to the source terminal of the second N-type field effect transistor Q2, a drain terminal coupled to the first terminal of the first inductor L1, and a gate terminal arranged to receive a switching signal. The second N-type field effect transistor Q2 has a source terminal coupled to the source terminal of the first N-type field effect transistor Q2, a drain terminal coupled to the second terminal of the second inductor L2, and a gate terminal arranged to receive a switching signal.

The second bidirectional switch 124 has a third N-type field effect transistor Q3 and a fourth N-type field effect transistor Q4. The third N-type field effect transistor Q3 has a source terminal coupled to the source terminal of the fourth N-type field effect transistor Q4, a drain terminal coupled to the second terminal of the first inductor L1, and a gate terminal arranged to receive the switching signal. The fourth N-type field effect transistor Q4 has a source terminal coupled to the source terminal of the third N-type field effect transistor Q3, a drain terminal coupled to the first terminal of the second inductor L2, and a gate terminal arranged to receive the switching signal.

The rectifier circuit 140 has a first diode D1, a second diode D2, a third diode D3, a fourth diode D4 and a capacitor CO. The first diode D1 has an anode coupled to the second terminal of the first inductor L1 and a cathode coupled to the cathode of the second diode D2, wherein the anode of the first diode D1 is serves as the first input terminal of the rectifier circuit 140. The second diode D2 has an anode coupled to the second terminal of the second inductor L2 and a cathode coupled to the cathode of the first diode D1, wherein the anode of the second diode D2 is serves as the second input terminal of the rectifier circuit 140. The third diode D3 has an anode coupled to the anode of the fourth diode D4 and a cathode coupled to the anode of the first diode D1. The fourth diode D4 has an anode coupled to the anode of the third diode D3 and a cathode coupled to the anode of the second diode D2. The capacitor CO has a first terminal coupled to the cathode of the first diode D1 and the cathode of the second diode D2. The capacitor CO further has a second terminal coupled to the anode of the third diode D3 and the anode of the fourth diode D4.

Figure 16:
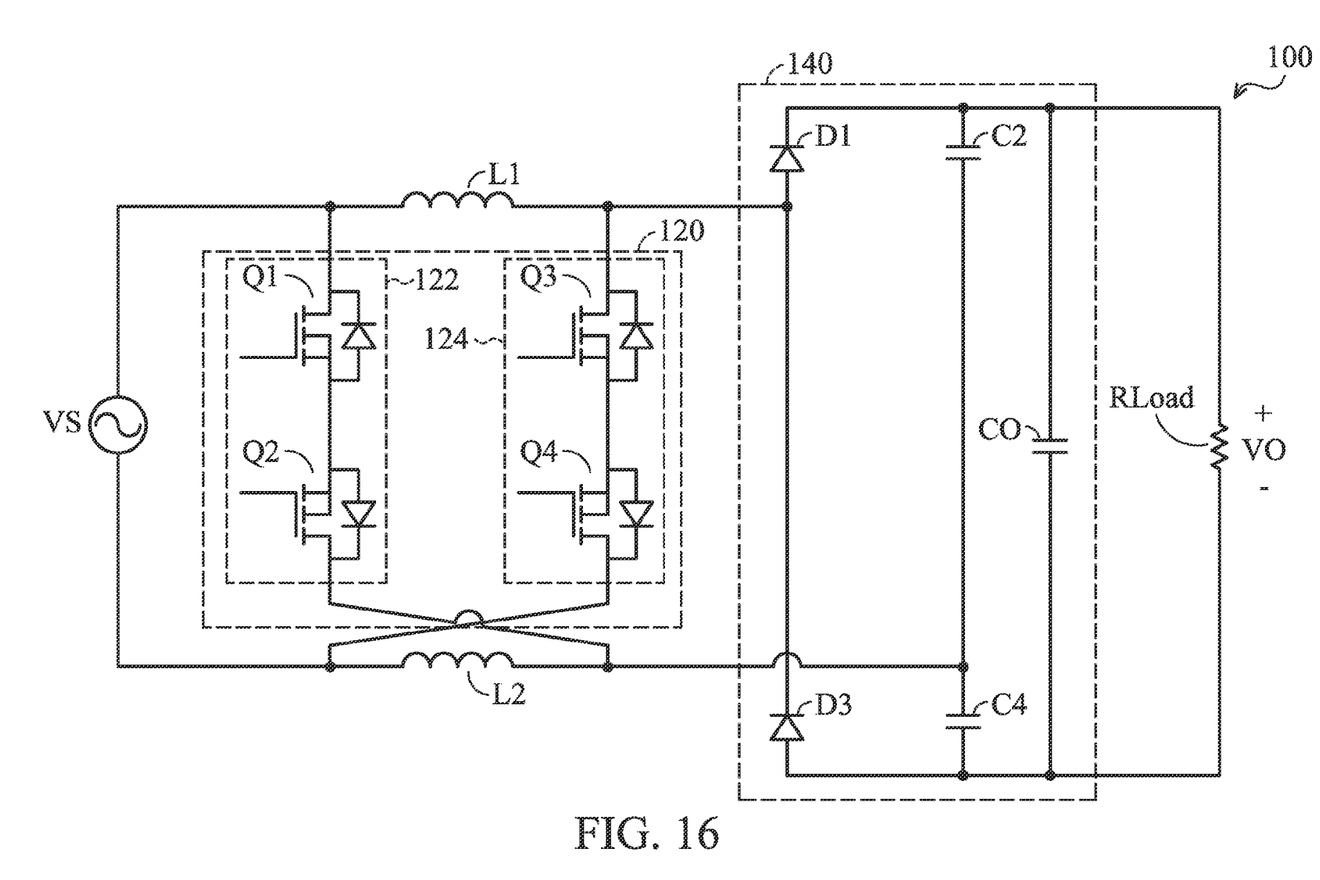
FIG. 16 is a schematic diagram illustrating another embodiment of a power-factor converter with nonlinear conversion ratio of the present invention.

It should be noted that, in another embodiment of the present invention, the rectifier circuit 140 is a voltage-doubling circuit, wherein the voltage-doubling circuit is similar to the bridge-rectifier circuit of FIG. 2 except that the second diode D2 and the fourth diode D4 are replaced by the capacitor C2 and the capacitor C4 in the voltage-doubling circuit, as shown in FIG. 16, but it is not limited thereto. Moreover, FIG. 16 shows a power-factor converter 100 with nonlinear conversion ratio including the voltage-doubling circuit, and the operation of the power-factor converter 100 of FIG. 16 is similar to the power-factor converter 100 having the bridge-rectifier circuit of FIG. 2. Reference may be made to FIG. 2 for operation of the power-factor converter 100 of FIG. 16

Figure 3:
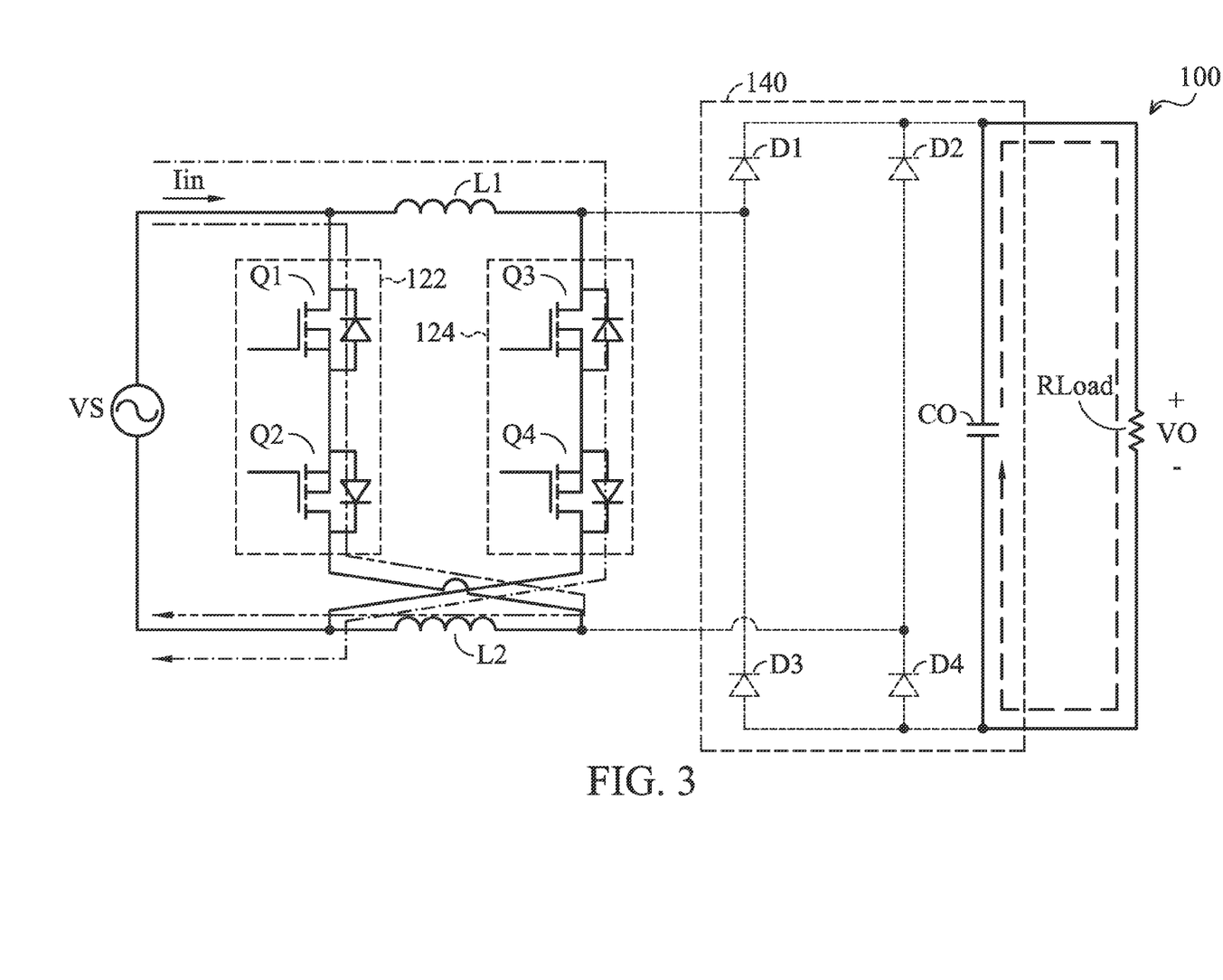
FIG. 3 is a schematic diagram illustrating the operation of the power-factor converter with nonlinear conversion ratio of FIG. 2 of the present invention.

FIG. 3 is a schematic diagram illustrating the operation of the power-factor converter with nonlinear conversion ratio of FIG. 2 of the present invention. The power-factor converter 100 of FIG. 3 is in the period corresponding to the positive half wave of the AC power source VS of the inductor-charging phase. In FIG. 3, the switching signals with high levels are applied to the control terminals of the first N-type field effect transistor Q1, the second N-type field effect transistor Q2, the third N-type field effect transistor Q3 and the fourth N-type field effect transistor Q4, such that the first N-type field effect transistor Q1, the second N-type field effect transistor Q2, the third N-type field effect transistor Q3 and the fourth N-type field effect transistor Q4 are turned on. In FIG. 3, the connection of the first inductor L1 and the second inductor L22 is equivalent to the parallel connection, such that the first inductor L1 and the second inductor L22 can be charged at the same time. Furthermore, the first inductor L1 and the second inductor L22 are decoupled from the rectifier circuit 140, wherein the slope of the input current Iin is:

$$\frac{VS}{LP} > 0,$$

LP=L1//L2. Moreover, the capacitor CO of the rectifier circuit 140 is discharged to the load RLoad in FIG. 3.

Figure 4:
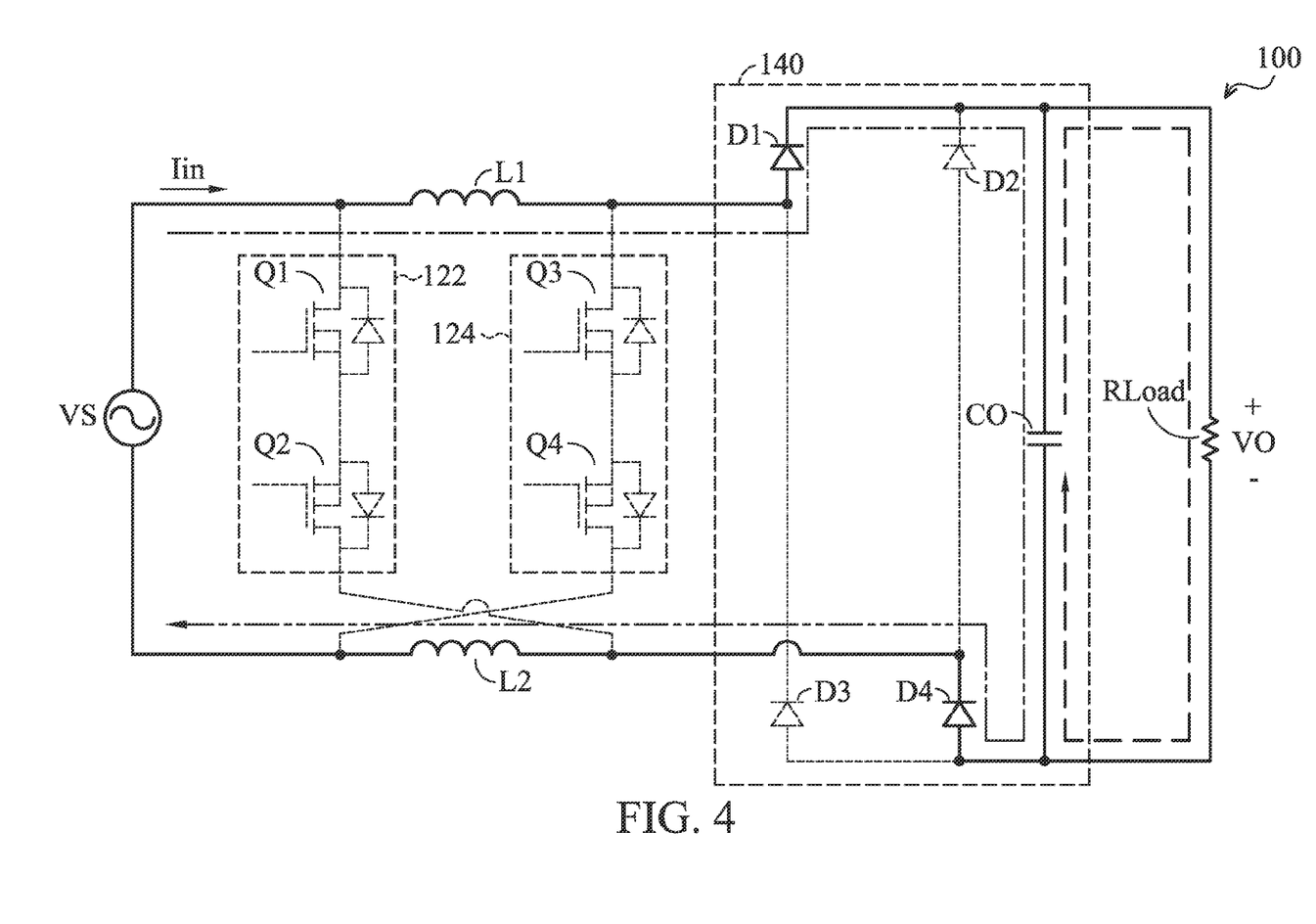
FIG. 4 is a schematic diagram illustrating the operation of the power-factor converter with nonlinear conversion ratio of FIG. 2 of the present invention.

FIG. 4 is a schematic diagram illustrating the operation of the power-factor converter with nonlinear conversion ratio of FIG. 2 of the present invention. The power-factor converter 100 of FIG. 4 is in the period corresponding to the positive half wave of the AC power source VS of the inductor-discharging phase, the switching signals with low level are applied to the control terminals of the first N-type field effect transistor Q1. In FIG. 4, the second N-type field effect transistor Q2, the third N-type field effect transistor Q3 and the fourth N-type field effect transistor Q4, such that the first N-type field effect transistor Q1, the second N-type field effect transistor Q2, the third N-type field effect transistor Q3 and the fourth N-type field effect transistor Q4 are turned on. In FIG. 4, the connection of the first inductor L1 and the second inductor L22 is equivalent to the sires connection, and the electrical energy stored in the first inductor L1 and the second inductor L22 in the inductor-charging phase is discharged in series to the rectifier circuit 140, wherein the slope of the input current Iin is $$\frac{|VS - VO|}{LS},$$

LS=(L1+L2). Moreover, the capacitor CO of the rectifier circuit 140 is arranged to be discharged to the load RLoad in FIG. 4.

Figure 5:
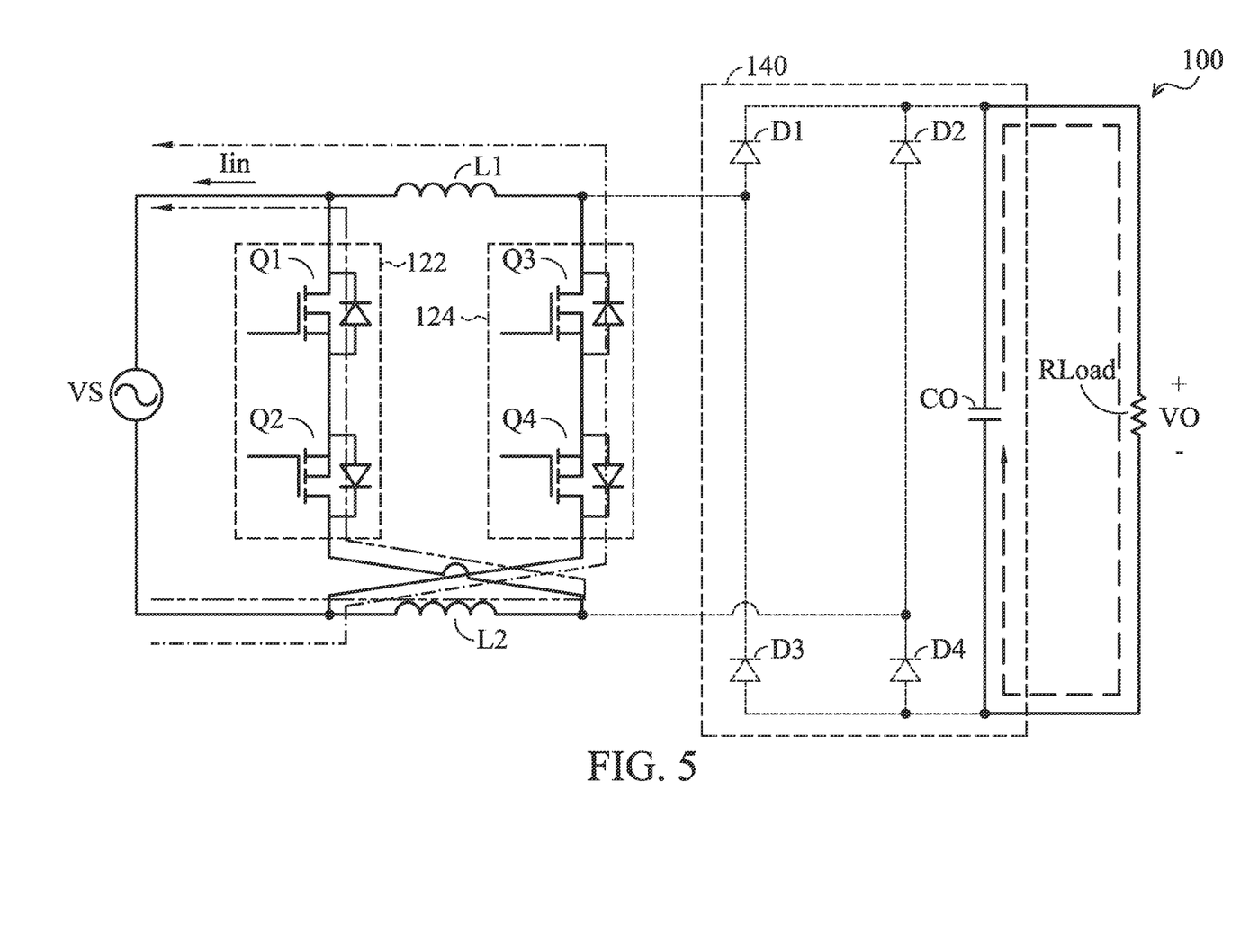
FIG. 5 is a schematic diagram illustrating the operation of the power-factor converter with nonlinear conversion ratio of FIG. 2 of the present invention.

FIG. 5 is a schematic diagram illustrating the operation of the power-factor converter with nonlinear conversion ratio of FIG. 2 of the present invention. The power-factor converter 100 of FIG. 5 is in the period corresponding to the negative half-wave of the AC power source VS in the inductor-charging phase. In FIG. 4, the switching signals with high level are applied to the control terminals of the first N-type field effect transistor Q1, the second N-type field effect transistor Q2, the third N-type field effect transistor Q3 and the fourth N-type field effect transistor Q4, such that the first N-type field effect transistor Q1, the second N-type field effect transistor Q2, the third N-type field effect transistor Q3 and the fourth N-type field effect transistor Q4 are turned on. In FIG. 5, the connection of the first inductor L1 and the second inductor L2 is equivalent to the parallel connection, such that the first inductor L1 and the second inductor L2 are charged at the same time. Furthermore, the first inductor L1 and the second inductor L2 are decoupled from the rectifier circuit 140 in FIG. 5, wherein the slope of the input current Iin is $$\frac{|VS|}{LP} > 0,$$

LP=L1//L2. Moreover, the capacitor CO of the rectifier circuit 140 is discharged to the load RLoad in FIG. 5.

Figure 6:
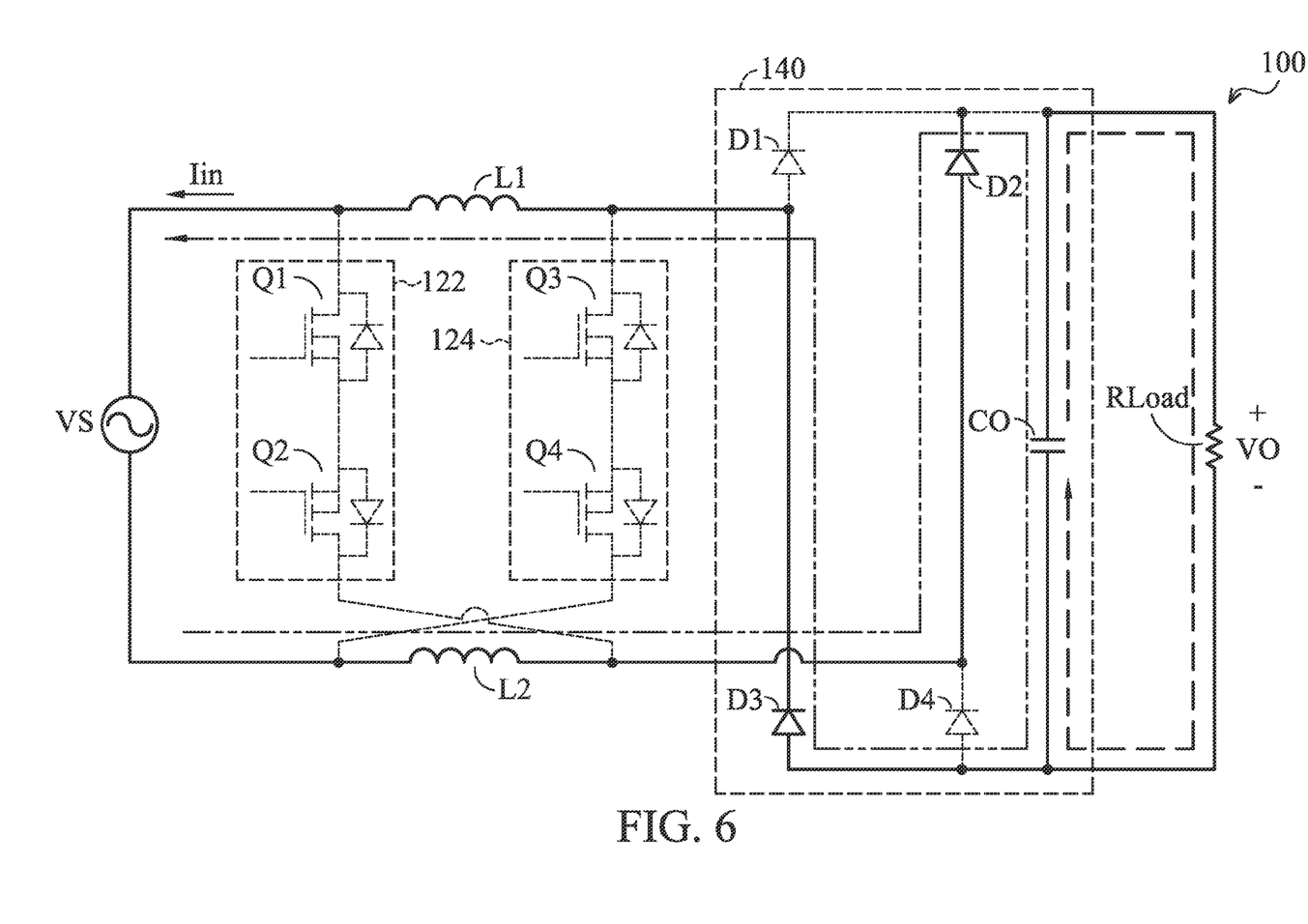
FIG. 6 is a schematic diagram illustrating the operation of the power-factor converter with nonlinear conversion ratio of FIG. 2 of the present invention.

FIG. 6 is a schematic diagram illustrating the operation of the power-factor converter with nonlinear conversion ratio of FIG. 2 of the present invention. The power-factor converter 100 of FIG. 6 is in the period corresponding to the negative half-wave of the AC power source VS in the inductor-discharging phase. In FIG. 6, the switching signals with low level are applied to the control terminals of the first N-type field effect transistor Q1, the second N-type field effect transistor Q2, the third N-type field effect transistor Q3 and the fourth N-type field effect transistor Q4, such that the first N-type field effect transistor Q1, the second N-type field effect transistor Q2, the third N-type field effect transistor Q3 and the fourth N-type field effect transistor Q4 are turned on. In FIG. 6, the connection of the first inductor L1 and the second inductor L22 is equivalent to the series connection, and the electrical energy stored in the first inductor L1 and the second inductor L22 in the inductor-charging phase is discharge in series to the rectifier circuit 140, wherein the slope of the input current Iin is $$\frac{|VS - VO|}{LS},$$

LS=(L1+L2). Moreover, the capacitor CO of the rectifier circuit 140 is discharged to the load RLoad in FIG. 6.

Figure 7:
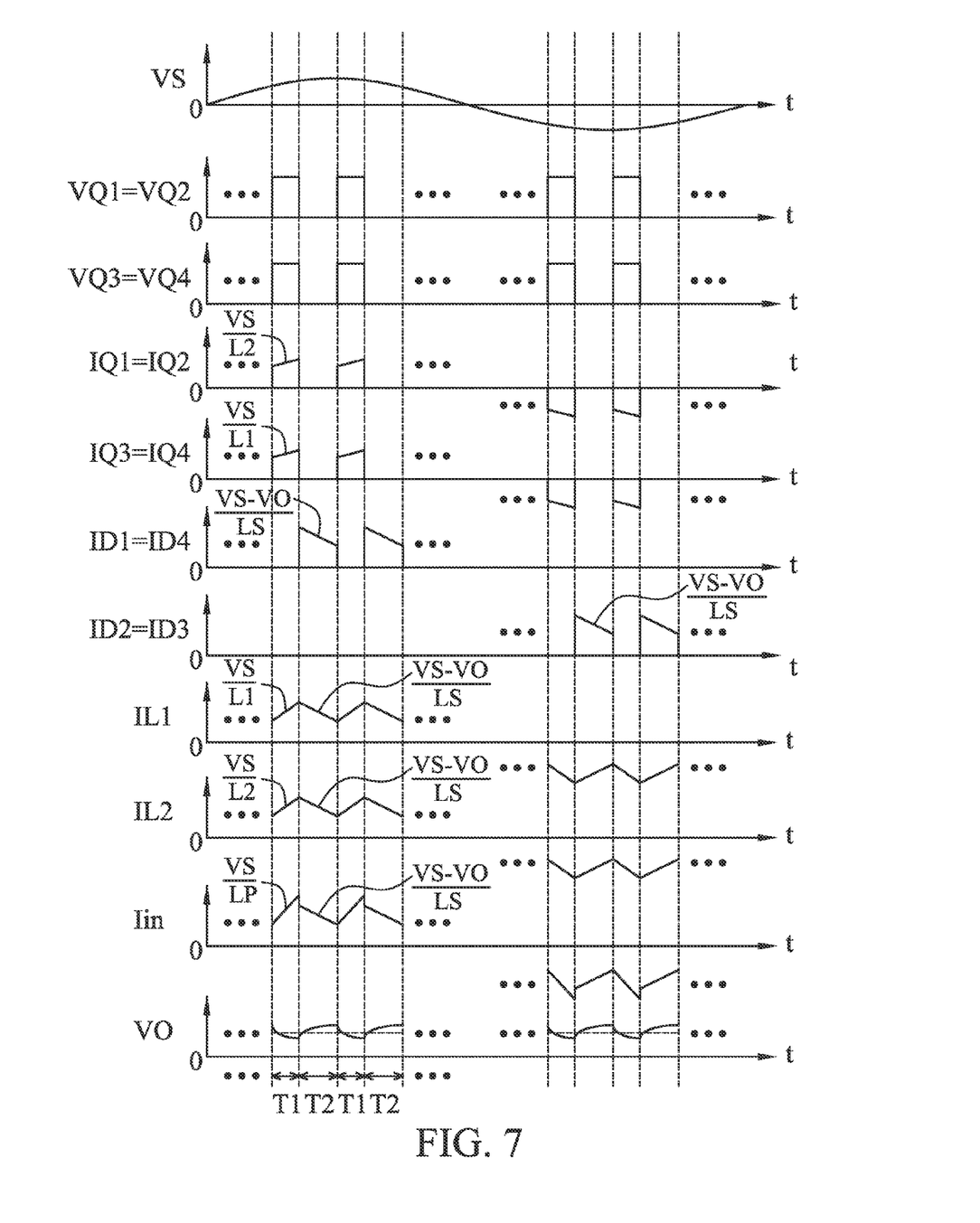
FIG. 7 is a schematic diagram illustrating the operation of the power-factor converter with nonlinear conversion ratio of FIG. 2 of the present invention.

FIG. 7 is a schematic diagram illustrating the operation of the power-factor converter with nonlinear conversion ratio of FIG. 2 of the present invention. In FIG. 7, the switching signals VQ1, VQ2, VQ3, VQ4 are arranged to be applied to the control terminals of the first N-type field effect transistor Q1, the second N-type field effect transistor Q2, the third N-type field effect transistor Q3 and the fourth N-type field effect transistor Q4, respectively, to switch the first N-type field effect transistor Q1, the second N-type field effect transistor Q2, the third N-type field effect transistor Q3 and the fourth N-type field effect transistor Q4. Therefore, the power-factor converter 100 with nonlinear conversion ratio can work between the inductor-charging phase T1 and the inductor-discharging phase T2. The currents IQ1, IQ2, IQ3 and IQ4 are the current on the first N-type field effect transistor Q1, the second N-type field effect transistor Q2 and the third N-type field effect transistor Q3, wherein IQ1=IQ2, and the slopes of IQ1 and IQ2 are $$\frac{VS}{L2}.$$

Moreover, IQ3=IQ4, and the slopes of IQ3 and IQ4 are $$\frac{VS}{L1}.$$

The currents ID1, ID2, ID3 and ID4 are the current on the first diode D1, the second diode D2, the third diode D3 and the fourth diode D4, wherein ID1=ID4, the slopes of ID1 and ID4 are $$\frac{(VS-VO)}{LS}.$$

Moreover, ID2=ID3 and the slopes of currents ID2 and ID3 are $$\frac{(VS-VO)}{LS}.$$

The currents IL1 and IL2 are the current on the first inductor L1 and the second inductor L2, wherein the slope (charge rate) of the current IL1 in the inductor-charging phase T1 is $$\frac{VS}{L1},$$

the slope (charge rate) of the current IL1 in the inductor-discharging phase T2 is $$\frac{(VS-VO)}{LS}.$$

The slope (charge rate) of the current IL2 in the inductor-charging phase T1 is $$\frac{VS}{L2},$$

and me slope (charge rate) of the current IL2 in the inductor-discharging phase T2 is $$\frac{(VS-VO)}{LS}.$$

The current Iin is me input current. The voltage at the load RLoad is VO. The input/output voltage transfer function of the conventional power boost converter (as shown in FIG. 15) is $$\frac{VO}{VS} = \frac{1}{1-D};$$

and the input/output voltage transfer function of the power-factor converter 100 is $$\frac{VO}{VS} = \frac{1+D}{1-D}.$$

In the same condition of input and output, the power-factor converter 100 with nonlinear conversion ratio of the present invention has the lower duty compared with the conventional power converter.

Figure 8:
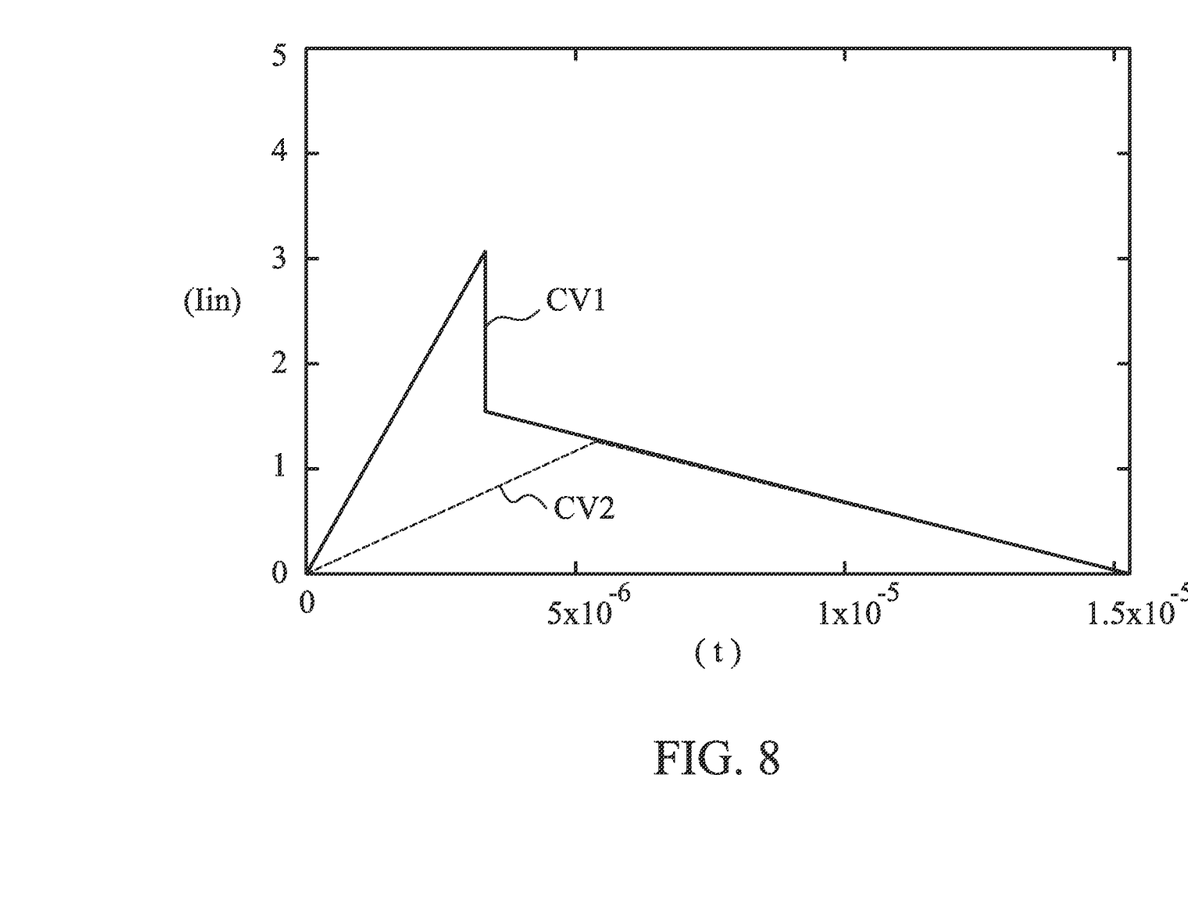
FIG. 8 is a simulation diagram illustrating the input current of the power-factor converter with nonlinear conversion ratio of FIG. 2 and the power-factor converter of FIG. 15.
Figure 15:
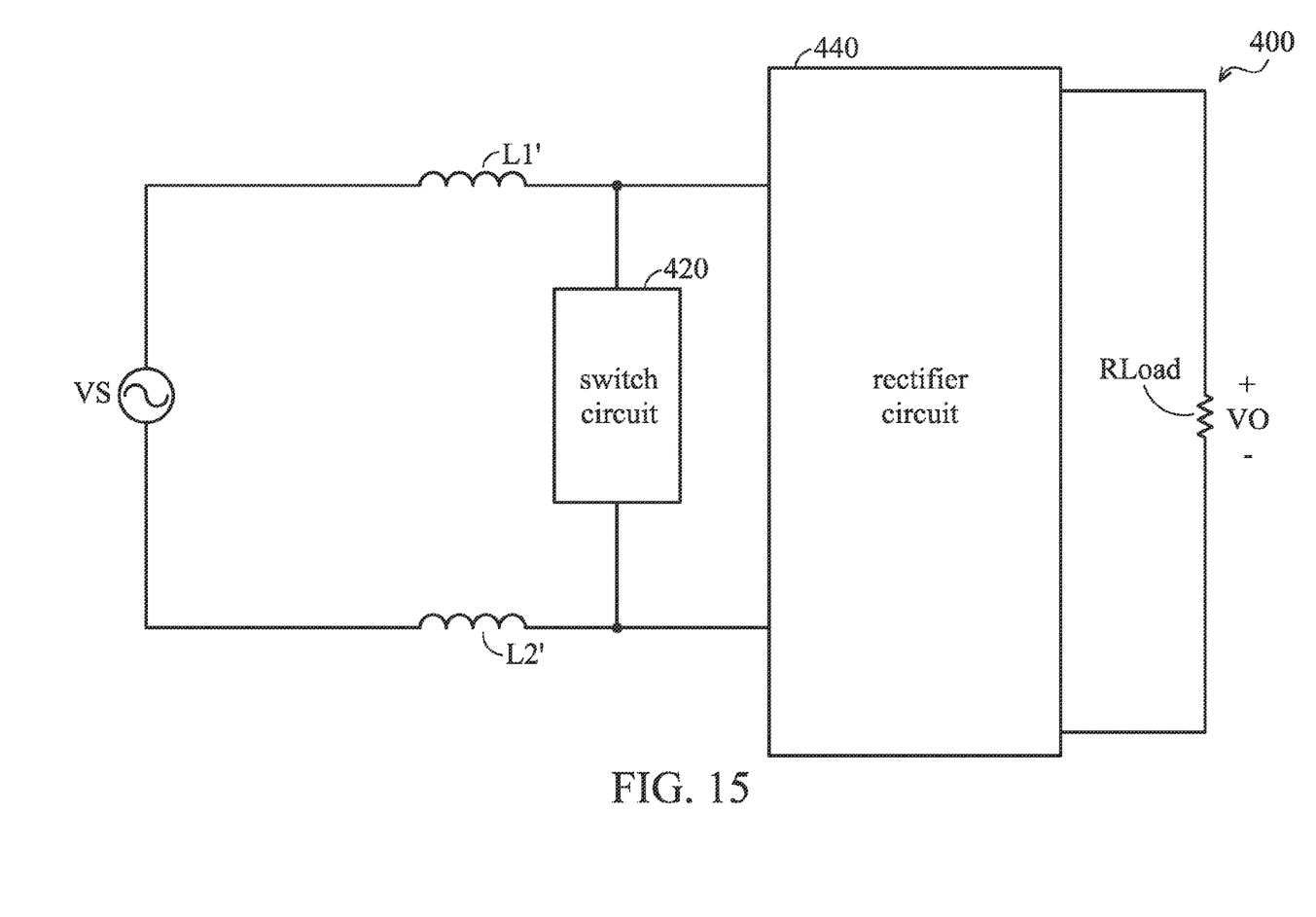
FIG. 15 is a schematic diagram illustrating another embodiment of a power-factor converter of the present invention.

FIG. 8 is a simulation diagram illustrating the input current of the power-factor converter with nonlinear conversion ratio of FIG. 2 and the power-factor converter of FIG. 15. The power-factor converter 400 of FIG. 15 is constituted by a non-bridge converter, wherein the non-bridge converter can reduce the common mode noise and enhance the power density. The power-factor converter 400 has a first inductor L1', a second inductor L2', a switch circuit 420 and a rectifier circuit 440. The first inductor L1' has a first terminal coupled to the first terminal of the AC power source VS and a second terminal coupled to the first terminal of the switch circuit 120. The second inductor L2' has a first terminal coupled to the second terminal of the AC power source VS and a second terminal coupled to the second terminal of the switch circuit 420. Namely, the switch circuit 120 is coupled to the first inductor L1' and the second inductor L2' in series connection. Moreover, the second terminals of the first inductor L1' and the second inductor L2' are coupled to the input terminals of the rectifier circuit 140, respectively. Moreover, the rectifier circuit 140 is arranged to be coupled to the load RLoad for providing the voltage VO to the load RLoad.

In FIG. 8, the curve CV1 is the input current Iin of the power-factor converter 100 with nonlinear conversion ratio of FIG. 2, and the curve CV2 is the input current Iin of the power-factor converter 400 of FIG. 15. As shown in FIG. 8, the slope of the input current Iin of the power-factor converter 100 with nonlinear conversion ratio of FIG. 2 is greater than the power-factor converter 400, such that the waveform of the current is closer to the voltage at the zero-crossing point.

In FIG. 8, the curve CV1 is the input current Iin of the power-factor converter 100 with nonlinear conversion ratio of FIG. 2, and the curve CV2 is the input current Iin of the power-factor converter 400 of FIG. 15. As shown in FIG. 8, the slope of the input current Iin of the power-factor converter 100 of FIG. 2 is greater than the power-factor converter 400 of FIG. 15, such that the waveform of the current is closer to the voltage at the zero-crossing point.

Figure 9:
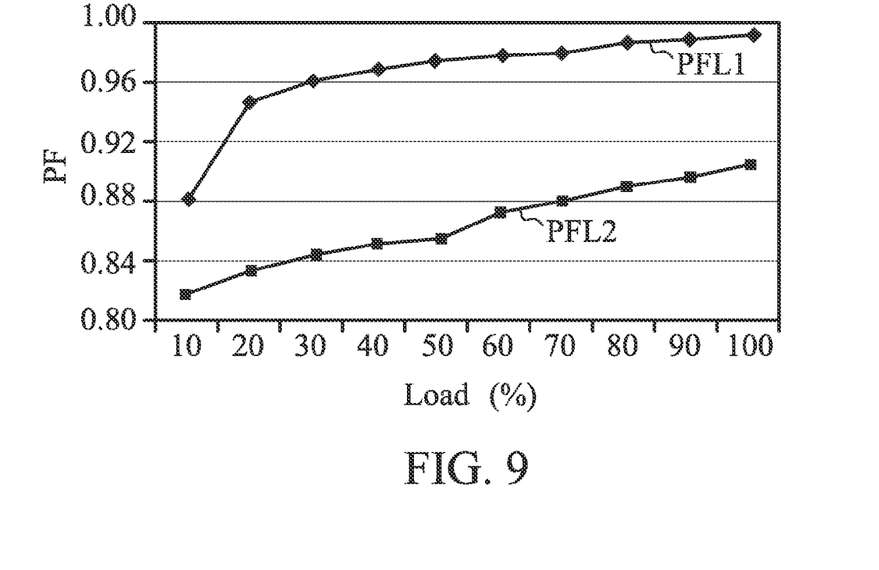
FIG. 9 is a simulation diagram illustrating the relationship between power-factor and load of the power-factor converter shown in FIG. 2 and the power-factor converter shown in FIG. 15.

FIG. 9 is a simulation diagram illustrating the relationship between power-factor and load of the power-factor converter of FIG. 2 and the power-factor converter of FIG. 15, wherein the input voltage (VS) is 230 volt, and the output voltage (VO) is 400 volt. In FIG. 9, the power-factor curve PFL1 is the curve of the power-factor and load RLoad of the power-factor converter 100 with nonlinear conversion ratio of FIG. 2, and the power-factor curve PFL2 is the curve of the power-factor and load RLoad of the power-factor converter 400 of FIG. 15.

As shown in FIG. 9, the power-factor converter 100 with nonlinear conversion ratio has a better power-factor than the power-factor converter 400.

Figure 10:
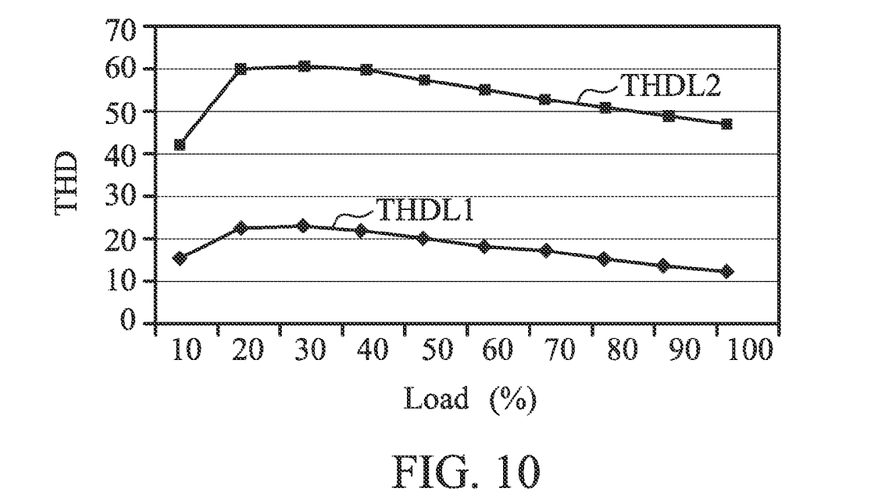
FIG. 10 is a simulation diagram illustrating the relationship between total harmonic distortion and load of the power-factor converter shown in FIG. 2 and the power-factor converter shown in FIG. 15.

FIG. 10 is a simulation diagram illustrating the relationship between total harmonic distortion and load of the power-factor converter shown in FIG. 2 and the power-factor converter shown in FIG. 15, wherein the output voltage (VS) is 230 volt, and the input voltage (VO) is 400 volt. In FIG. 10, the total-harmonic-distortion curve THDL1 is the curve of the total harmonic distortion and the load RLoad of the power-factor converter 100 of FIG. 2, and the total-harmonic-distortion curve THDL2 is the curve of the total harmonic distortion and the load RLoad of the power-factor converter 400 of FIG. 15. In FIG. 10, the power-factor converter 100 with nonlinear conversion ratio has the lower total harmonic distortion than the power-factor converter.

Figure 11:
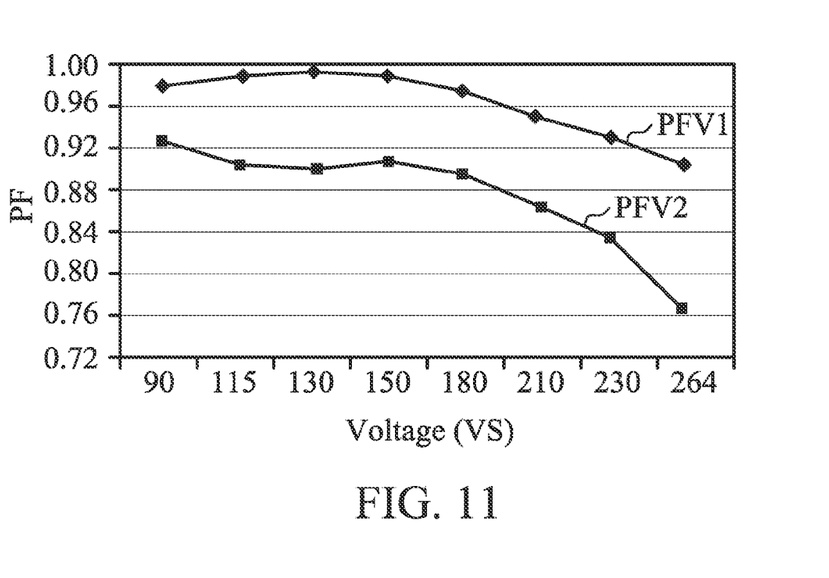
FIG. 11 is a simulation diagram illustrating the relationship between power-factors and voltage of the power-factor converter shown in FIG. 2 and the power-factor converter shown in FIG. 15.

FIG. 11 is a simulation diagram illustrating the relationship between power-factors and voltage of the power-factor converter shown in FIG. 2 and the power-factor converter shown in FIG. 15, wherein the output voltage (VO) is 400 volts, and the load RLoad is 20%. In FIG. 11, the power-factor curve PFV1 is the curve of the power-factor and input voltage (VS) of the power-factor converter 100 of FIG. 2, and the power-factor curve PFV2 is the curve of the power-factor and input voltage (VS) of the power-factor converter 400 of FIG. 15. As shown in FIG. 11, the power-factor converter 100 with nonlinear conversion ratio has a better power-factor than the power-factor converter 400.

Figure 12:
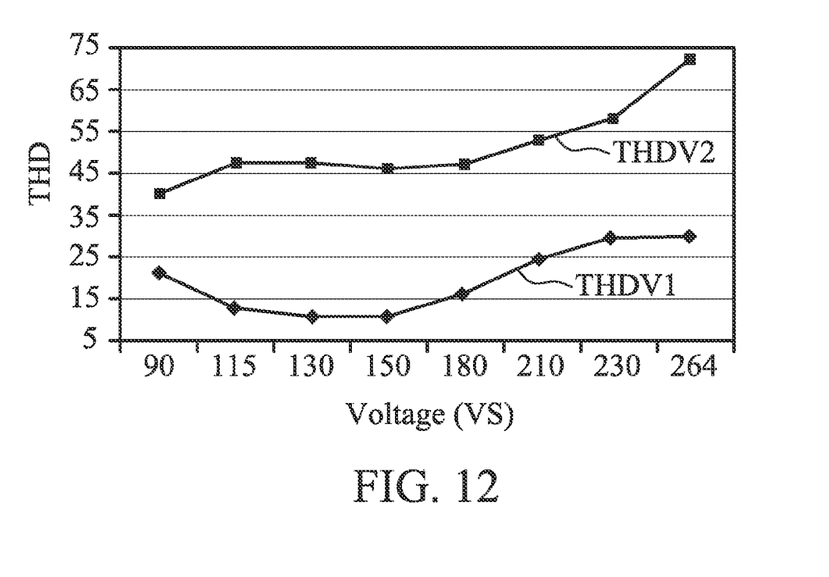
FIG. 12 is a simulation diagram illustrating the relationship between total harmonic distortion and voltage of the power-factor converter shown in FIG. 2 and the power-factor converter shown in FIG. 15.

FIG. 12 is a simulation diagram illustrating the relationship between total harmonic distortion and voltage of the power-factor converter shown in FIG. 2 and the power-factor converter shown in FIG. 15, wherein the output voltage (VO) is 400 volt, and the load RLoad is 20%. In FIG. 12, the total-harmonic-distortion curve THDV1 is the curve of the total harmonic distortion and the input voltage (VS) of the power-factor converter 100 of FIG. 2, and the total-harmonic-distortion curve THVL2 is the curve of the total harmonic distortion and the input voltage (VS) of the power-factor converter 400 of FIG. 15. As shown in FIG. 20, the power-factor converter 100 with nonlinear conversion ratio has the lower total harmonic distortion than the power-factor converter 400.

Figure 13:
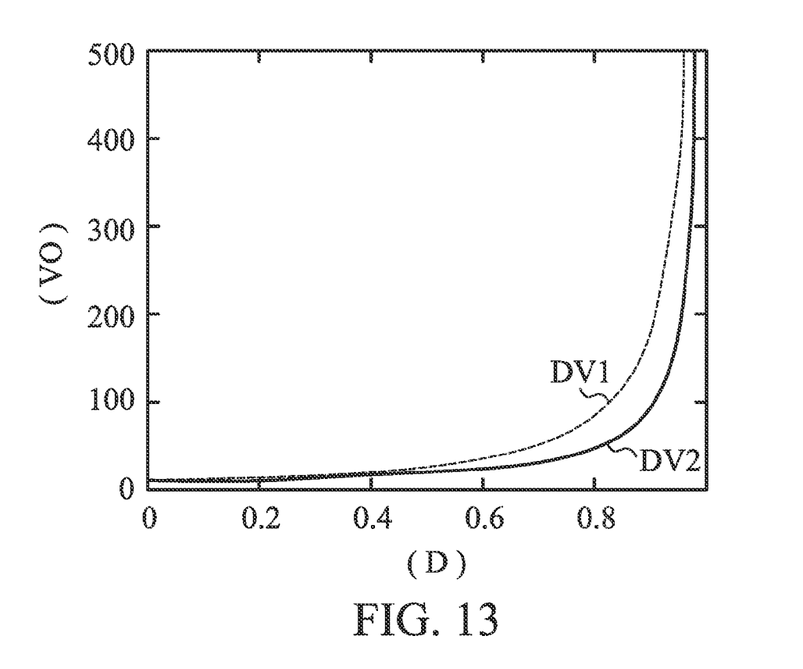
FIG. 13 is a simulation diagram illustrating the relationship between output voltages and duty of the power-factor converter shown in FIG. 2 and the power-factor converter shown in FIG. 15.

FIG. 13 is a simulation diagram illustrating the relationship between output voltages and duty of the power-factor converter shown in FIG. 2 and the power-factor converter shown in FIG. 15. In FIG. 13, the duty curve DV1 is the curve of the output voltage (VO) and duty of the power-factor converter 100 with nonlinear conversion ratio of FIG. 2, and the duty curve DV2 is the curve of the output voltage (VO) and duty of the power-factor converter 400 of FIG. 15. In FIG. 13, the power-factor converter 100 with nonlinear conversion ratio has the lower duty than the power-factor converter 400.

Figure 14:
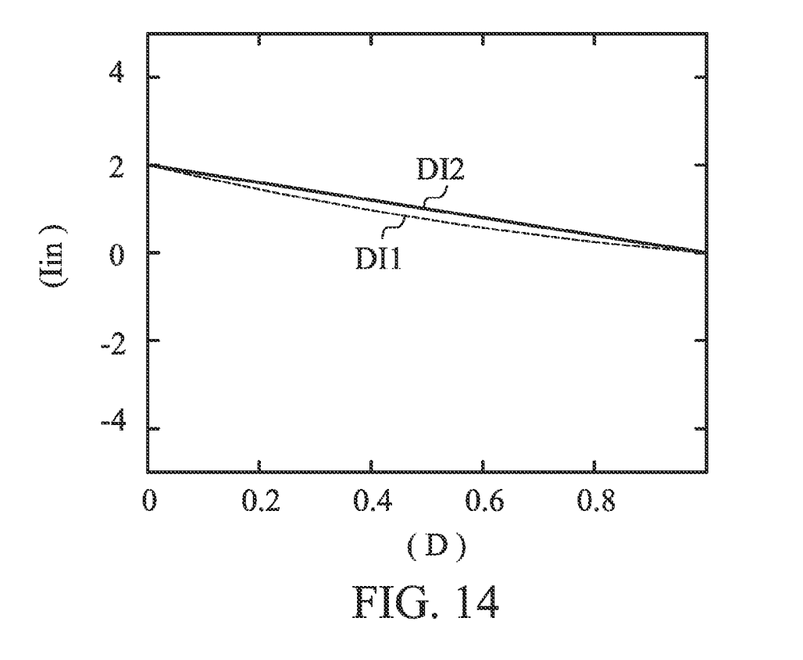
FIG. 14 is a simulation diagram illustrating the relationship between input current and duty of the power-factor converter shown in FIG. 2 and the power-factor converter shown in FIG. 15.

FIG. 14 is a simulation diagram illustrating the relationship between input current and duty of the power-factor converter shown in FIG. 2 and the power-factor converter shown in FIG. 15. In FIG. 14, the duty curve DI1 is the curve of the input current (Iin) and the duty of the power-factor converter 100 with nonlinear conversion ratio of FIG. 2, the duty curve DI2 is the curve of the input current (Iin) and the duty of the power-factor converter 400 of FIG. 15. As shown in FIG. 14, the power-factor converter 100 with nonlinear conversion ratio has the lower input current than the power-factor converter 400 with the same duty.

The power-factor converter 100 with nonlinear conversion ratio of the present invention is arranged to be switched to change the connection construction of the inductors for improving the problems of zero-crossing, power-factor, total harmonic distortion and power consumption.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power-factor converter with nonlinear conversion ratio, comprising:
   a rectifier circuit;
   a first inductor, having a first terminal coupled to a first terminal of an AC power source, and a second terminal coupled to a first input terminal of the rectifier circuit;
   a second inductor, having a first terminal coupled to a second terminal of the AC power source, and a second terminal coupled to a second input terminal of the rectifier circuit; and
   a switch circuit, comprising:
   a first bidirectional switch, having a first terminal coupled to the first terminal of the first inductor, and a second terminal coupled to the second terminal of the second inductor; and
   a second bidirectional switch, having a first terminal coupled to the first terminal of the second inductor, and a second terminal coupled to the second terminal of the first inductor, wherein the first bidirectional switch and the second bidirectional switch are turned on and turned off simultaneously, the first bidirectional switch and the second bidirectional switch keep turning on in an inductor-charging phase, and the first bidirectional switch and the second bidirectional switch keep turning off in an inductor-discharging phase, wherein the power-factor converter is in the inductor-charging phase while at least one of the first inductor and the second inductor is being charged.

2. The power-factor converter with nonlinear conversion ratio as claimed in claim 1, wherein the first bidirectional switch and the second bidirectional switch are switched with a predetermined frequency.

3. The power-factor converter with nonlinear conversion ratio as claimed in claim 2, wherein the first bidirectional switch and the second bidirectional switch are turned on to form a circuit equivalent to a parallel connection of the first inductor and the second inductor in the inductor-charging phase of the first inductor and the second inductor for charging the first inductor and the second inductor in parallel by the AC power source.

4. The power-factor converter with nonlinear conversion ratio as claimed in claim 3, wherein the first bidirectional switch and the second bidirectional switch are turned off to form a circuit equivalent to a series connection of the first inductor and the second inductor in the inductor-discharging phase of the first inductor and the second inductor for discharging electrical energy stored in the first inductor and the second inductor to the rectifier circuit, wherein the electrical energy stored in the first inductor and the second inductor is charged in the inductor-charging phase.

5. A power-factor converter with nonlinear conversion ratio, comprising:
   a first inductor;
   a second inductor;
   a rectifier circuit; and
   a switch circuit, coupled between the first inductor, the second inductor, the rectifier circuit and an AC power source, arranged to conduct or cut off electricity of the first inductor and the second inductor from the AC power source, wherein the switch circuit comprises a first bidirectional switch and a second bidirectional switch, and the first bidirectional switch and the second bidirectional switch are turned on and turned off simultaneously, wherein the switch circuit is arranged to form a circuit equivalent to a parallel connection of the first inductor and the second inductor by keeping the first bidirectional switch and the second bidirectional switch on in an inductor-charging phase, and form a circuit equivalent to a series connection of the first inductor and the second inductor by keeping the first bidirectional switch and the second bidirectional switch off in an inductor-discharging phase, wherein the power-factor converter is in the inductor-charging phase while at least one of the first inductor and the second inductor is being charged.

6. The power-factor converter with nonlinear conversion ratio as claimed in claim 5, wherein the first inductor and the second inductor are arranged to be charged by the AC power source in the inductor-charging phase, and electrical energy stored in the inductor-charging phase of the first inductor and the second inductor is arranged to be discharged to the rectifier circuit in the inductor-discharging phase.

7. The power-factor converter with nonlinear conversion ratio as claimed in claim 5, wherein the first inductor has a first terminal coupled to a first terminal of the AC power source and a second terminal coupled to a first input terminal of the rectifier circuit, and the second inductor has a first terminal coupled to a second terminal of the AC power source and a second terminal coupled to a second input terminal of the rectifier circuit.

8. The power-factor converter with nonlinear conversion ratio as claimed in claim 7, wherein the first bidirectional switch has a first terminal coupled to the first terminal of the first inductor and a second terminal coupled to the second terminal of the second inductor, and the second bidirectional switch, has a first terminal coupled to the first terminal of the second inductor and a second terminal coupled to the second terminal of the first inductor.

9. The power-factor converter with nonlinear conversion ratio as claimed in claim 8, wherein the first bidirectional switch and the second bidirectional switch are switched with a predetermined frequency, and wherein the first inductor and the second inductor are being charged in parallel by the AC power source in the inductor-charging phase.

10. The power-factor converter with nonlinear conversion ratio as claimed in claim 9, wherein the series connection of the first inductor and the second inductor in the inductor-discharging phase discharges electrical energy stored in the inductor-charging phase of the first inductor and the second inductor to the rectifier circuit.

* * * * *